(12) United States Patent
Buss et al.

(10) Patent No.: US 6,578,349 B2
(45) Date of Patent: Jun. 17, 2003

(54) PIVOTING GEARBOX FOR ROTARY MOWER

(75) Inventors: Steven Henry Buss, Horicon, WI (US); Todd Lynn Smith, Beaver Dam, WI (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 09/923,686

(22) Filed: Aug. 7, 2001

(65) Prior Publication Data

US 2003/0029150 A1 Feb. 13, 2003

(51) Int. Cl.[7] .............................................. A01D 69/00
(52) U.S. Cl. ........................................ 56/11.6; 474/114
(58) Field of Search .............................. 56/10.8, 11.6, 56/14.7, 16.7; 474/113, 114, 116

(56) References Cited

U.S. PATENT DOCUMENTS

| 2,372,342 A | * | 3/1945 | Smith et al. | 474/115 |
| 2,456,088 A | * | 12/1948 | Scircle | 474/114 |
| 4,454,706 A | | 6/1984 | Geeck, III | |
| 4,887,992 A | * | 12/1989 | Dixon | 474/114 |
| 4,907,401 A | | 3/1990 | Nemoto et al. | |
| 5,069,022 A | * | 12/1991 | Vandermark | 56/15.5 |
| 5,465,561 A | | 11/1995 | Samejima et al. | |
| 5,769,747 A | * | 6/1998 | Kuhn et al. | 474/135 |
| 5,927,055 A | * | 7/1999 | Ferree et al. | 56/15.9 |
| 6,176,071 B1 | | 1/2001 | Thorman et al. | |
| 6,334,292 B1 | * | 1/2002 | Walch et al. | 56/11.6 |

FOREIGN PATENT DOCUMENTS

| FR | 2801951 | 8/2001 |
| GB | 2056836 | 3/1981 |

* cited by examiner

*Primary Examiner*—Thomas B. Will
*Assistant Examiner*—Nathan Mammen

(57) ABSTRACT

A pivotal drive assembly is provided for the ease of removal and/or replacement of a drive belt. The drive assembly preferably includes a splined input shaft connected to a gear box which drives a rotating drive pulley. The entire drive assembly is connected to the lower deck by front and rear mounting plates. Each mounting plate also includes two bent ears which are aligned with front and rear deck brackets. The ears are connected to the deck brackets with bolts. The bolts on the rear deck bracket and rear mounting plate are positioned in axial alignment on a generally horizontal plane to allow pivotal movement of the drive assembly. The bolts on the front deck brackets may be removed to allow for pivotal movement of the drive assembly and replaced to secure the drive assembly for operation of the mowing deck.

9 Claims, 3 Drawing Sheets

PIVOTING GEARBOX FOR ROTARY MOWER

BACKGROUND OF THE INVENTION

1) Field of the Invention

The present invention relates generally to the drive assembly for an implement such as a rotary mower on a lawn and garden tractor. More particularly, though not exclusively, the present invention relates to a drive assembly which may be easily re-positioned to assist in the removal and replacement of a drive belt.

2) Related Art

Vehicles such as lawn and garden tractors are often adapted to carry and operate implements such as mower decks. To drive the blade or blades of a mower deck, a pulley and drive belt arrangement is commonly used. The pulley is typically coupled through a drive assembly to a crank shaft or transmission on the vehicle's power source. Currently the drive assembly is secured to the mower deck in a manner which makes removal and replacement of the drive belt difficult. Typically, the entire drive assembly must be removed from the mower deck before replacement of the drive belt may occur. A great amount of time, effort and labor are involved in removing the entire drive assembly. This leads to preventative replacement of the drive belt before the end of the drive belts useful life. Replacement is typically done when the mower will be out of service for a long period of time, such as during winter months. If removal of the drive assembly were simplified, replacement of the drive belt could occur at the end of the drive belt's useful life or upon belt failure.

BRIEF SUMMARY OF THE INVENTION

It is therefore an objective of the present invention to provide a drive assembly which overcomes most or all of the above-listed disadvantages.

It is a further objective of the present invention to provide a drive assembly which may be easily repositioned to allow for easy removal and/or replacement of the drive belt.

It is another objective of the present invention to provide a method of replacing the drive belt which reduces the amount of necessary labor.

It is still a further objective of the present invention to provide a method of replacing the drive belt which reduces the amount of time the implement must be out of service.

A drive assembly constructed in accordance with the teachings of the present invention relates to a rotatable drive assembly which includes an input shaft, a gearbox, and rotating drive pulley secured in a first position during operation of the implement. The input shaft transmits power from the vehicle's power source, through the crank shaft or transmission into the gear box which is connected to the rotating drive pulley to power the drive belt. When the need to replace the belt arises, the entire drive assembly may be rotated or pivoted about a horizontal axis into a second position, thereby allowing the user to easily remove and replace the drive belt.

DETAILED DESCRIPTION OF THE INVENTION

Figure 1:
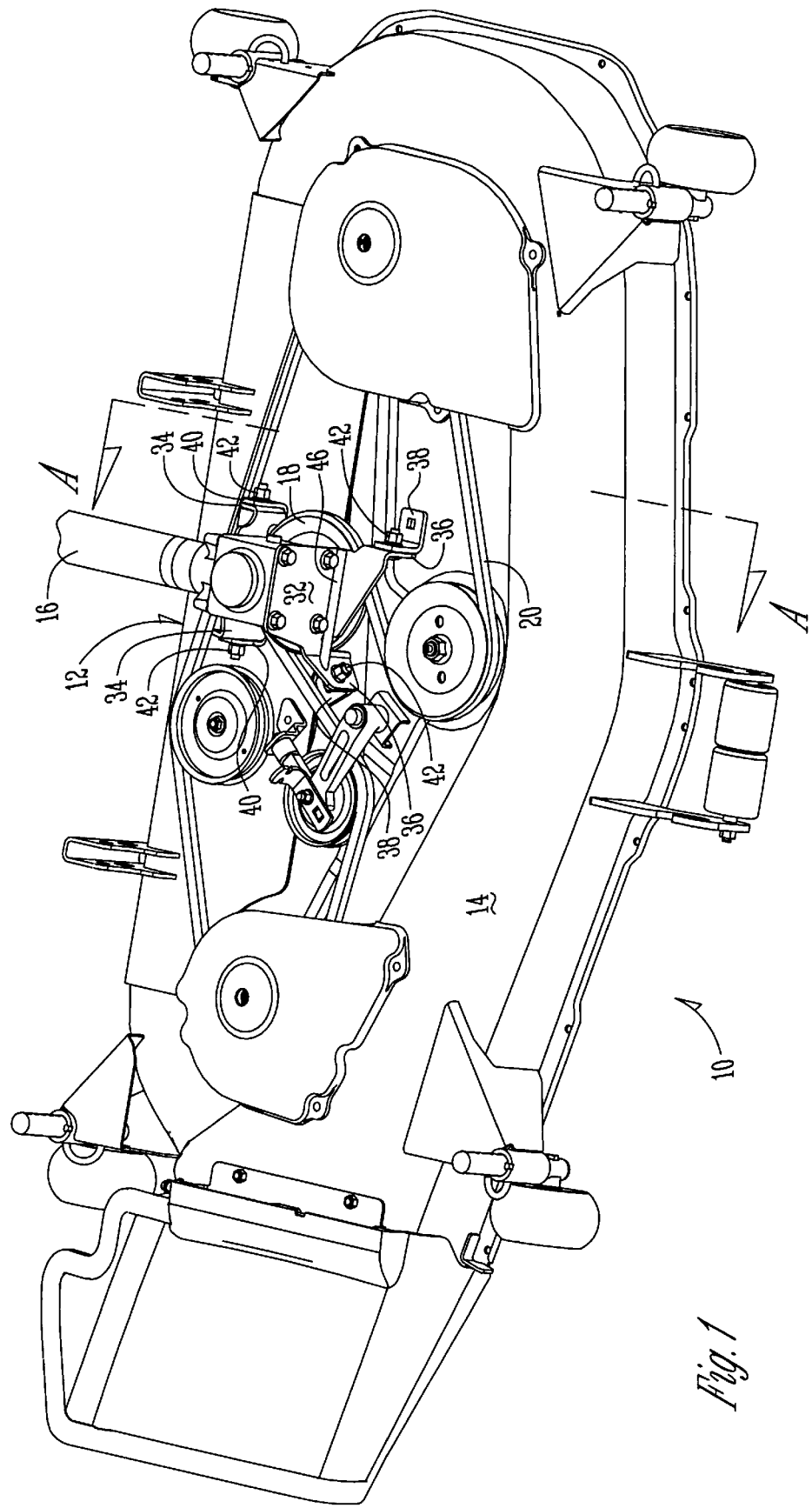
FIG. 1 is a perspective view of a mower deck with a belt and pulley drive system according to the present invention.

The mowing deck 10, shown in FIG. 1, generally includes a drive assembly 12 mounted on the mower deck housing 14. The drive assembly 12 receives power from shaft 16 or the transmission of the lawn and garden tractor or other vehicle through commonly known methods. This power is used to turn the rotating drive pulley 18 which engages the drive belt 20 to power or turn the blade pulleys 22. The blade pulleys 22 turn the mower blades 24 within the mower deck housing 14.

Figure 2:
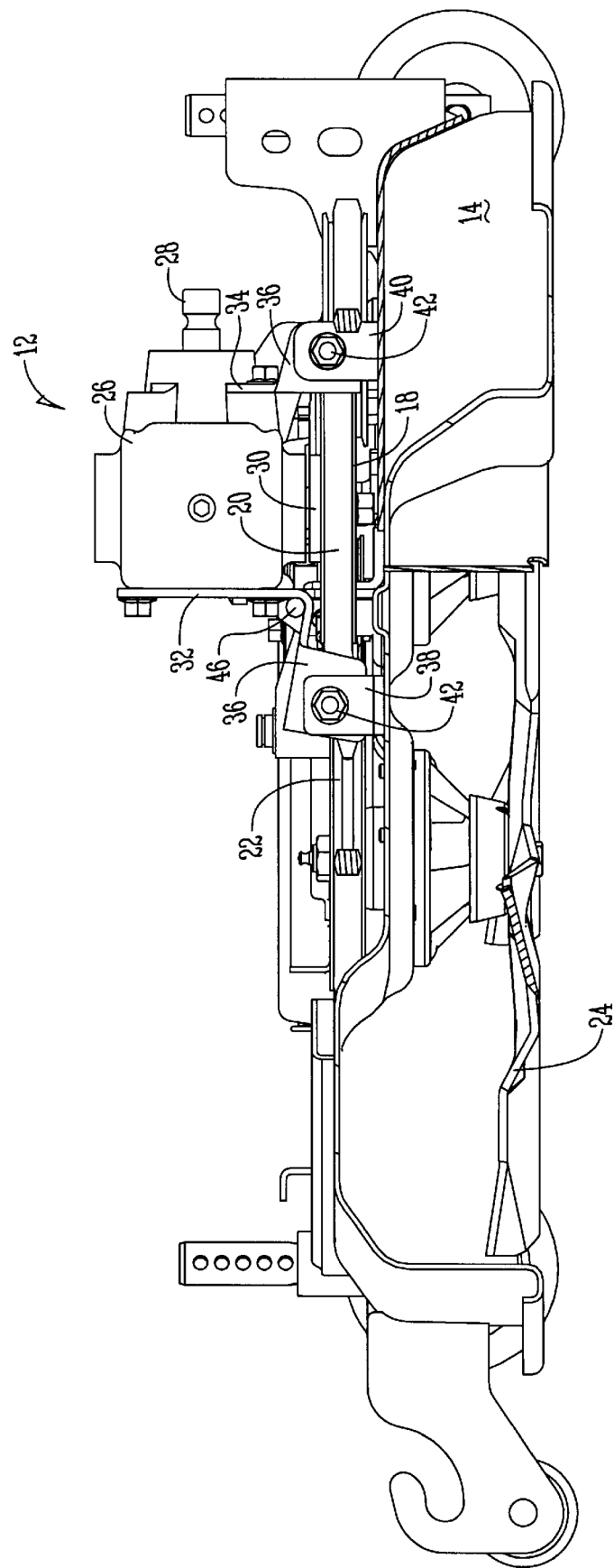
FIG. 2 is a cross-sectional view of the mower deck of FIG. 1 taken along line A—A of FIG. 1.

As can be seen in FIG. 2, the drive assembly 12 generally comprises an input shaft 28 which is operatively connected to a vehicle's power source 16 and transmits power to a gear box 26. The gear box 26 transfers the power input from the input shaft 28 to the rotating drive pulley 18. The rotating drive pulley 18 turns the drive belt 20 and thereby powers the mower blades 24.

Figure 3:
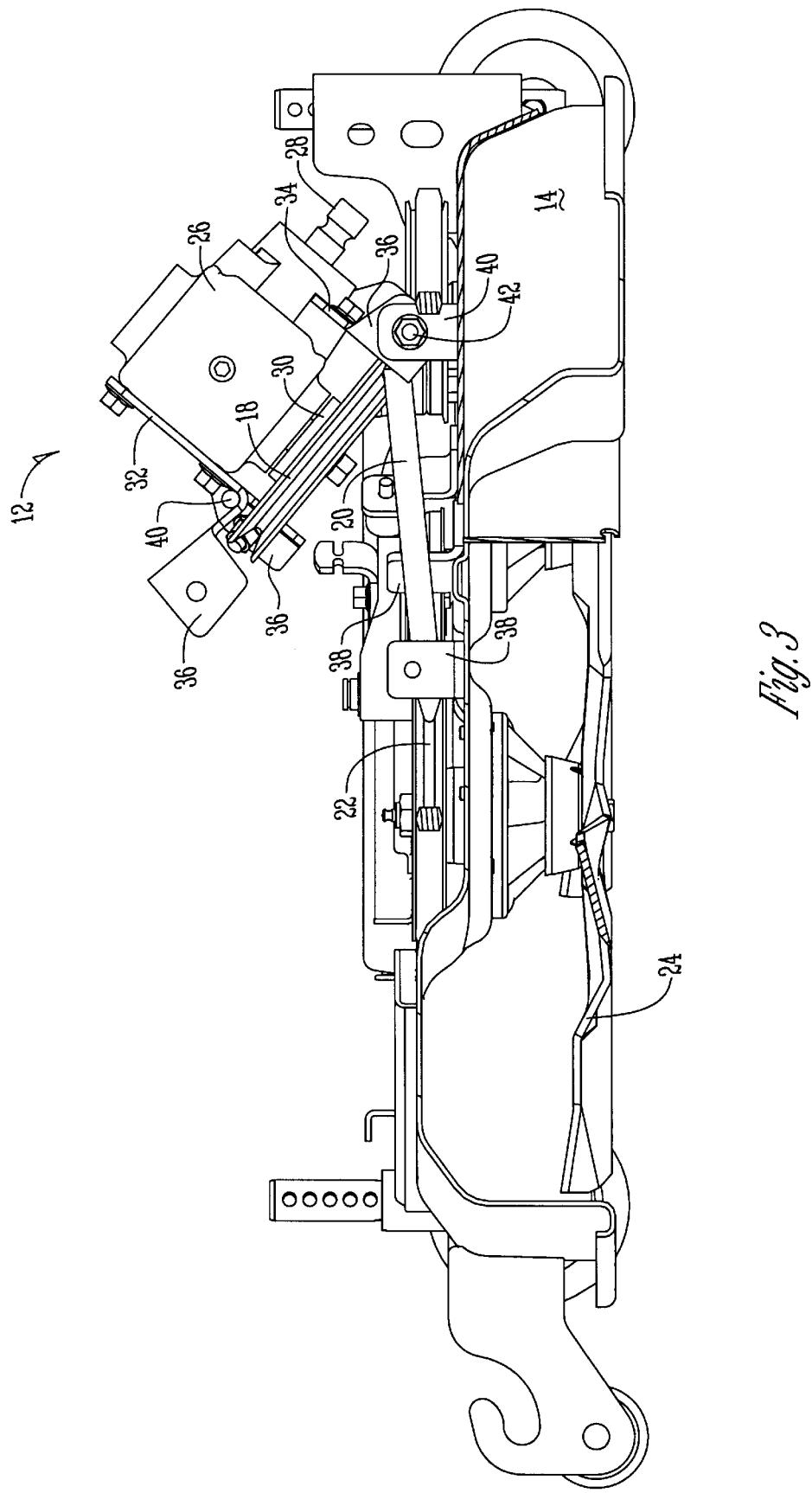
FIG. 3 is a cross-sectional view of the mower deck of FIG. 1 taken along line A—A of FIG. 1 wherein the drive assembly is in an upwardly pivoted position.

Preferably, the gear box 26 is secured to the mower deck 14 in a fixed position during operation. When the drive belt 20 needs replacement, the drive assembly 12 may be rotated about a horizontal axis to allow easy removal and/or replacement of the drive belt 20 as shown in FIG. 3. To accomplish this, the drive assembly 12 is hingedly secured to the mower deck 14 on one side and removably secured to the mower deck 14 on the other side. Preferably, a front mounting plate 32 is attached to the front of the drive assembly 12.

The front mounting plate 32 includes two ears 36 which are properly aligned with two front deck brackets 38. A bolt 42 or any other type of known securing device is inserted through the front deck bracket 38 and the ears 36 to properly secure the front mounting plate 32 and drive assembly 12 to the mower deck 14.

Additionally, a rear mounting plate 34 is attached to the drive assembly 12. The rear mounting plate 34 also includes two ears 36 which correspond to two rear deck brackets 40. The rear deck brackets 40 are properly aligned to provide a horizontal axis at the rear of the drive assembly 12. While separate rear deck brackets 40 may be used, preferably, the rear deck bracket is formed as a single strap of metal with ends bent upward at ninety degrees.

The rear deck brackets 40 are secured to the ears 36 on the rear mounting plate 34 with additional bolts 42 or other securing means.

The drive assembly 12 can be pivoted, or rotated about the horizontal axis by simply removing the bolts 42 from the front deck brackets 38 and ears 36 of the front mounting plate 32. After removal of the bolts 42 from the front deck brackets 38, the bolts 42 and the rear deck brackets 40 are loosened to allow the drive assembly 12 to freely rotate about the horizontal axis running through the bolts 42 in the rear deck brackets 40. In this manner, the drive shaft 16 does need to be removed from the gear box 26. Rotation of the drive assembly 12 provides the necessary clearance to easily install or replace the drive belt without entirely removing the gearbox assembly 12.

A general description of the present invention as well as a preferred embodiment of the present invention has been set forth above. Those skilled in the art to which the present invention pertains will recognize and be able to practice additional variations in the methods and apparatus described which fall within the teachings of this invention.

Accordingly, all such modifications and additions are deemed to be within the scope of the invention which is to be limited only by the claims appended hereto.

What is claimed is:

1. A mower deck drive assembly allowing for easy replacement of a drive belt, the mower deck drive assembly comprising:
    a gear box rotatably secured to a mower deck, the gear box being movable between a first position during operation of the mower deck and a second position for replacement of a drive belt; and
    a drive pulley operatively secured to the gear box for transmitting power from the gear box to the drive belt in the first position and outside a horizontal plane of the drive belt in the second position.

2. The mower deck drive assembly of claim 1 further comprising:
    a splined input shaft operatively connected to the crank shaft or transmission on a vehicle's power source.

3. The mower deck drive assembly of claim 1 wherein the gear box has a front side and rear side and the mower deck drive assembly further comprises:
    a front mounting bracket secured to the front side of the gear box, the front mounting bracket being selectively fixed to the mower deck; and
    a rear mounting bracket secured to the rear side of the gear box, the rear mounting bracket being rotatably secured to the mower deck.

4. The mower deck drive assembly of claim 3 wherein the rear deck bracket is a single piece.

5. A mower deck drive assembly allowing for easy replacement of a drive belt dwelling in a horizontal plane, the mower deck drive assembly comprising:
    a gear box rotatably secured to a mower deck, the gear box being movable between a first position during operation of the mower deck and a second position for replacement of a drive belt; and
    a drive pulley operatively secured the gear box and moveable in conjunction with the gear box outside the horizontal plane of the drive belt in the second position, the drive pulley secured for transmitting power from the gear box to the drive belt.

6. The mower deck assembly of claim 5, further comprising:
    a splined input shaft operatively connected to the crank shaft or transmission on a vehicle's power source.

7. The mower deck drive assembly of claim 5, wherein the gear box has a front side and rear side and the mower deck drive assembly further comprises:
    a front mounting bracket secured to the front side of the gear box, the front mounting bracket being selectively fixed to the mower deck; and
    a rear mounting bracket secured to the rear side of the gear box, the rear mounting bracket being rotatably secured to the mower deck.

8. The mower deck drive assembly of claim 7, wherein the rear deck bracket is a single piece.

9. The mower deck drive assembly of claim 5, wherein the drive assembly is disengaged from the drive belt when the gear box is in the second position.

* * * * *